United States Patent [19]

Kolakowski et al.

[11] 4,128,611
[45] Dec. 5, 1978

[54] CONTINUOUS PROCESS AND APPARATUS FOR PRODUCING FOAMED POLYMER BUNSTOCK HAVING A SUBSTANTIALLY RECTANGULAR CROSS-SECTION

[75] Inventors: Richard A. Kolakowski, Northford, Conn.; Richard M. Stroud, Houston, Tex.

[73] Assignee: The Upjohn Company, Kalamazoo, Mich.

[21] Appl. No.: 785,404

[22] Filed: Apr. 7, 1977

[51] Int. Cl.² .......................................... B29D 27/04
[52] U.S. Cl. ....................................... 264/51; 264/46.2; 264/338; 264/DIG. 84; 425/4 C; 425/110
[58] Field of Search ................. 264/45.8, 46.2, 46.3, 264/48, 51, 54, DIG. 84, 338; 425/4 C, 110

[56] References Cited

U.S. PATENT DOCUMENTS

| | | | |
|---|---|---|---|
| 3,208,103 | 9/1965 | Voelker | 264/46.2 X |
| 3,240,846 | 3/1966 | Voelker | 264/46.2 |
| 3,354,503 | 11/1967 | Joseph et al. | 264/46.2 X |
| 3,553,300 | 1/1971 | Buff | 264/48 X |
| 3,984,195 | 10/1976 | Del Carpio | 264/46.2 X |

Primary Examiner—Philip Anderson
Attorney, Agent, or Firm—Denis A. Firth; John Kekich

[57] ABSTRACT

A process and apparatus are described for the preparation of continuous polymer foam bunstock having substantially rectangular cross-section. The novel feature comprises a panel member having its downstream end pivotally mounted above a conventional moving trough-shaped mold, the underside of said panel member floating freely in tangential contact with the rising foam in the area immediately following the gel point of said foam but before the point at which the foam is no longer sufficiently mobile to be molded without distortion of the cells thereof.

10 Claims, 9 Drawing Figures

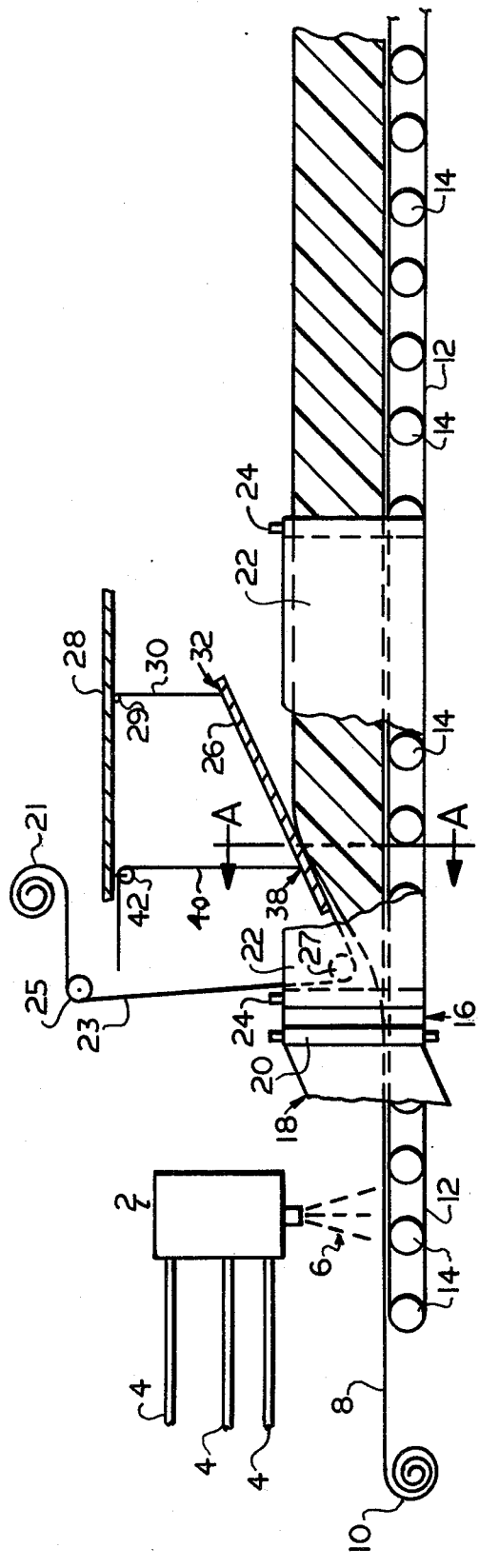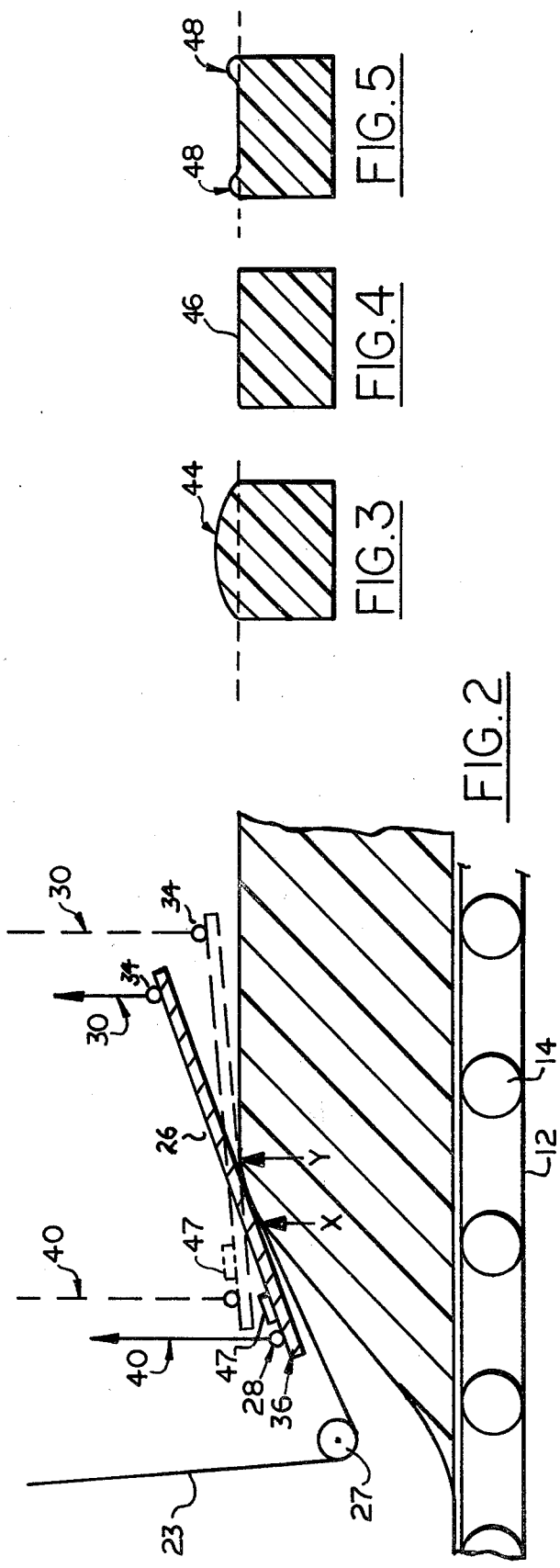

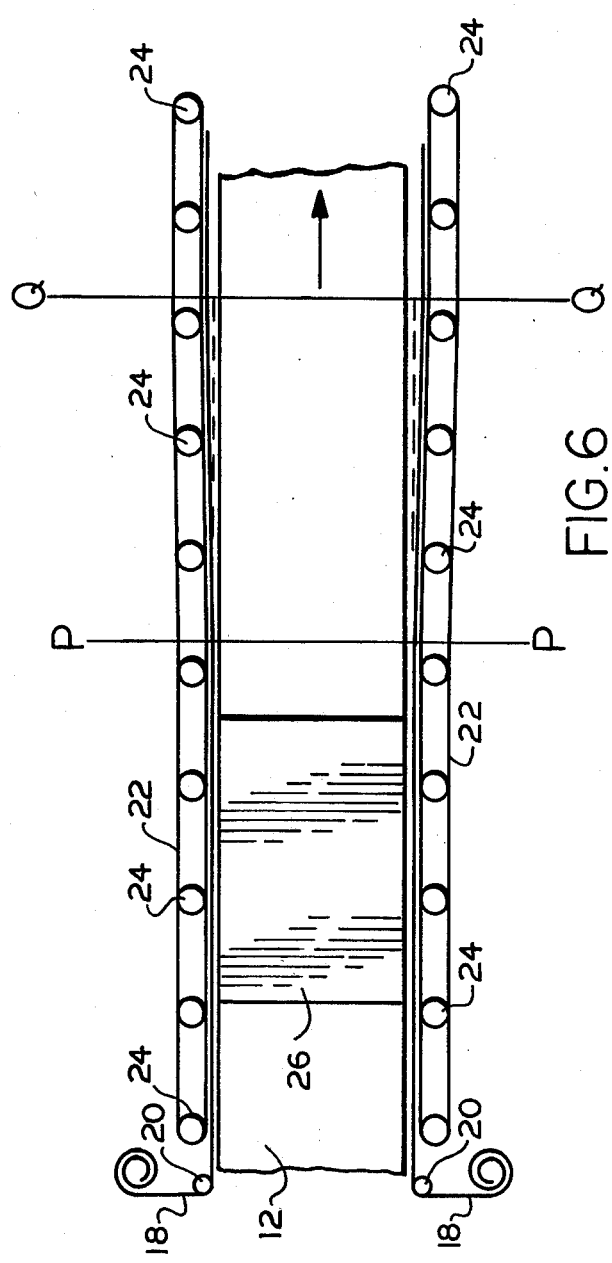
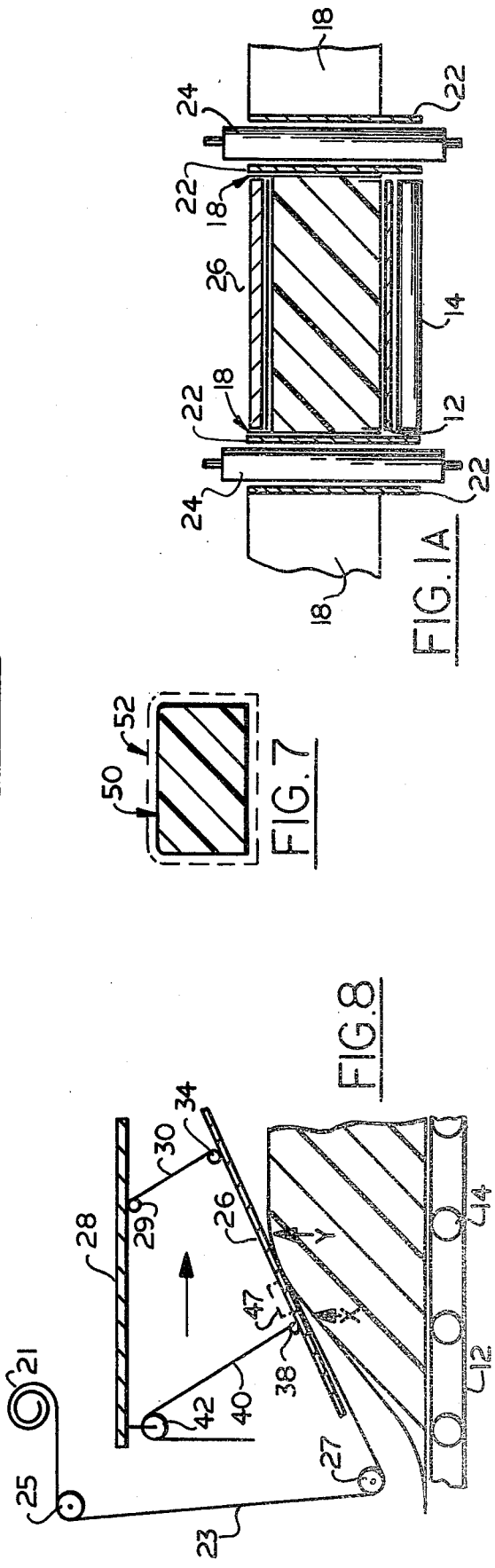

CONTINUOUS PROCESS AND APPARATUS FOR PRODUCING FOAMED POLYMER BUNSTOCK HAVING A SUBSTANTIALLY RECTANGULAR CROSS-SECTION

BACKGROUND OF THE INVENTION

1. Description of the Prior Art

The production of polymer foam, such as polyurethane, polyisocyanurate and like rigid foams, in the form of continuous bunstock by depositing foam forming mix in a U-shaped mold comprised of a lower conveyor belt and side panels moving in synchronized manner, is well-known in the art. The bunstock so produced is then generally cut to fabricate sheets, boardstock and the like for insulation purposes. In order to avoid substantial waste of useful foam in the cutting of boardstock and the like from the polymer foam bunstock, it is highly desirable that the bunstock be produced with substantially rectangular cross-section.

Various processes and devices have been employed to achieve this end. Illustratively, U.S. Pat. No. 3,655,311 describes the use of a tunnel shaped mold having a rectangular cross-section and having the top formed by a series of plates yieldably mounted so that they could be displaced upwardly if the rising foam exerted pressure thereon in excess of a predetermined level.

U.S. Pat. Nos. 3,965,228 and 3,998,575 describe respectively a process and apparatus for preparing substantially flat top foam bunstock by subjecting the lateral edges of the rising foam to the lifting action of a plurality of endless wires thereby seeking to overcome the drag exerted on said edges by friction between the rising foam and the sidewalls of the U-shaped mold employed to prepare the bunstock. U.S. Pat. Nos. 3,091,811; 3,719,734; 3,751,197; 3,809,512; 3,812,227 and 3,965,228 describe closely related apparatus and processes for achieving the same result using forces exerted by side papers moving at an inclination to the vertical corresponding approximately to the profile of the rising foam.

U.S. Pat. No. 3,768,937 describes a similar process in which air or gas filled elongated tubular sheets are fed along the sides of the rising foam in an otherwise conventional bunstock apparatus and are caused to rise in approximate synchronization with the profile of the rising foam so as to minimize frictional drag on the edges of the rising foam.

U.S. Pat. No. 3,325,823 describes a process in which an effect similar to that in which the side papers are moved upwardly is achieved by moving the side papers in the conventional manner but causing the rising foam to be moved downwardly so that a relative upward force is exerted by the side papers on the edges of the foam.

U.S. Pat. No. 3,984,195 describes a process for producing bunstock with a substantially rectangular cross-section by applying molding pressure on the rising foam by means of a plurality of rollers and the like throughout the major part of its rise profile as well as passing the initially deposited foam mix through a nip roll to achieve uniform thickness in the poured foam prior to rise.

U.S. Pat. No. 3,123,856 discloses a process in which elevated portions are provided in the center of the initial section of the floor of the moving U-shaped mold. The foam in the central portions of the mold accordingly rises initially to a greater height than the foam on the outer edges of the mold. Once the foam moves off the elevated section of the mold and reaches the section having a planar floor, the central portions of the foam subside thereby tending to form a more planar surface on the bunstock than that achieved by using a conventional bunstock molding apparatus.

U.S. Pat. No. 3,887,670 discloses the use in an otherwise conventional bunstock line of a combination of weirs and a pour board which has a profile corresponding to the mirror image of the rise profile of the rising foam whereby the frictional drag on the sides of the foam is minimized and a substantially rectangular cross-section is achieved in the resulting foam bunstock.

More recently, French application No. 74 27210 has described a process in which the rising foam is subjected, in an otherwise conventional foam bunstock apparatus, to the molding action of a fixed plate which straddles the rising foam at a point very close to the beginning of foam rise and which confines the foam to a particular configuration over the majority of the rise profile.

British specification No. 1,465,900, which issued after the present invention was completed, teaches the application of pressure to the rising foam over substantially the whole rise profile by means of a sheet contoured to match said rise profile.

The various processes discussed above generally require relatively extensive modification of conventional foam bunstock apparatus. In addition, they lack the flexibility necessary to deal, without modification, with the production of different types of polymer foam having different rise characteristics and profiles. For example, the rise characteristics of a polyurethane foam forming mix often differ quite dramatically from those of a polyisocyanurate foam forming mix. Bunstock apparatus designed to produce the former type of foam with rectangular cross-section could require extensive modification before being capable of production of the latter type of foam.

We have now developed a process for producing polymer foam bunstock having substantially rectangular cross-section without sacrifice of good structural properties which process can be carried out with only very simple modification of conventional foam bunstock apparatus and which can be readily adapted to producing bunstock from polymer foam mixes having widely varying rise profile characteristics.

SUMMARY OF THE INVENTION

This invention comprises a process for producing a continuous length of polymer foam bunstock having substantially rectangular cross-section, uniform density and uniform cell structure, which process comprises the steps of:

advancing at a predetermined, constant rate a continuous conveyor surface along a predetermined path of travel, said conveyor surface comprising a lower supporting portion and separate upstanding portions on laterally opposite sides of said lower portion and defining together a generally trough-like moving mold for the developing foam product;

continuously depositing liquid polymer-foam forming mixture on the floor of said moving mold at a location near the entrance thereto;

allowing said foam-forming mixture to expand freely at least until the gel point is reached;

causing said expanding foam, at a point beyond that at which the gel point is reached but before said foam is no longer sufficiently mobile to be molded without distortion of cell structure, to contact the underside of a panel member having a width substantially co-extensive with that of said moving mold and being pivotally mounted at the downstream end thereof above said moving mold, said panel member depending from said pivotal mounting and floating freely on said rising foam in tangential contact therewith; and adjusting the weight of said panel member so that it causes the said rising foam to assume a substantially rectangular cross-section.

The invention also comprises apparatus for carrying out said process which apparatus will be described in detail hereinafter.

BRIEF DESCRIPTION OF THE DRAWINGS

FIG. 1 is a side elevational view, partially in cutaway schematic form, of a conveyor system for the production of polymer foam bunstock.

FIG. 1A is a cross-sectional view taken along the line A—A of the conveyor system shown in FIG. 1.

FIG. 2 is an enlarged view of a portion of the conveyor system shown in FIG. 1 over which the foam rise takes place.

FIG. 3 is a cross-sectional view of polymer foam bunstock produced in accordance with prior art methods.

FIGS. 4, 5 and 7 are cross-sectional views of polymer foam bunstock produced in accordance with the present invention.

FIG. 6 is a plan view of the conveyor system for production of polymer foam bunstock shown in FIG. 1.

FIG. 8 is an enlarged view of a portion of the conveyor system shown in FIG. 1 showing another embodiment in accordance with the present invention.

DETAILED DESCRIPTION OF THE INVENTION

The process and apparatus of the invention will now be discussed with particular reference to the accompanying drawings. In the foam conveyor shown in partial schematic form in FIG. 1 the various components of the polymer foam forming mixture are fed to the mixing head 2 via hoses 4. The foam mix 6 is dispensed from the mixing head 2 on to a continuously advancing paper web 8 which is fed from roll 10. The mixing head is suspended from a bridge (not shown) and is caused to traverse back and forth across the width of the paper web 8 in a direction at right angles to the direction in which said paper web 8 is advanced. The paper web 8 is supported on, and moves synchronously with, an endless conveyor belt 12 which latter is in turn supported by roller bars 14. In an alternative embodiment the endless belt is replaced by a smooth metal plate over which the paper 8 is made to slide by appropriate pulling means applied to the paper. At a point immediately preceding the deposit of foam mix 6 on to paper web 8 the outer edges of the latter are folded upwardly by appropriate folding means (not shown) so as to retain liquid foam mix on said paper web after deposit thereon. The bed of the conveyor, formed by the endless belt 12 moving on roller bars 14, is inclined at an angle of about 4°–8° to the horizontal and slopes downwardly away from the point of deposit of foam mix 6.

At a location immediately preceding that at which the foam mix 6, deposited on the paper web 8, begins to expand and rise, side papers 18 are fed from paper rolls (not shown) on each side of the conveyor via rollers 20 mounted vertically alongside the conveyor on either side thereof. The side papers are supported by endless belts 22 carried by roller bars 24 or adjustable platens (not shown) on either side of said conveyor and forming with the bed of the conveyor a U-shaped trough for molding the foam bunstock. The side belts 22 are caused to move synchronously with the endless belt 12, which forms the floor of the conveyor, by appropriate drive means (not shown). The disposition of the various members in this section of the conveyor is shown more clearly in FIG. 1A which is a cross-sectional view of the conveyor taken through the line A—A in FIG. 1. A paper web 23 is also dispensed from paper roll 21 and led via roller bars 25 and 27 to the top surface of the rising foam.

The expanding foam mix gradually rises and, at a location near the top of the rise, shown in FIG. 1 and more clearly in the detailed view of this section of the conveyor shown in FIG. 2, the rising foam makes contact with the undersurface of a panel member 26. The latter is suspended from a bracket 29 in an overhead beam or gantry 28 by means of suspension member 30 which can take the form of a flexible or rigid rod, chain, rope or the like. The suspension member 30 is pivotally attached at its lower end 32 to the downstream end, i.e., the end remote from the location of foam deposit, of said panel member 26 by pivot member 34. The latter can be an appropriate hinge, coupling ring, hook and eye, and the like. While the suspension of the downstream end of the panel member 26 from the overhead beam or gantry 28 can be achieved by using a single suspension member 30 it is preferred to employ two such members mounted in parallel in a vertical plane at right angles to the direction of the advancing foam.

The panel member 26 slopes downwardly away from the pivotal mounting 34 and suspension member 30 and is provided, towards its other end 36, with a rope or chain 40 attached thereto by a second pivot member 38. The rope or chain 40 serves to raise or lower the panel member 26, via pulley means 42, to any desired position either before or during operation of the bunstock formation. In general, however, the lower end 36 of the panel member is not supported by the rope or chain 40 during operation of the process of the invention. Rather, the panel member depends from pivot member 34 and its lower end floats freely on the surface of the rising foam and is in tangential contact with the latter at a location between the points represented by X and Y in the rising foam. The location X represents the point in the rise of the foam at which the latter has reached the gel point. The location Y represents the point at which the foaming process has advanced to the stage at which the foam no longer has sufficient mobility to be subjected to molding forces, such as those exerted by the panel member 26, without deleterious effect on the cell structure and or other desirable physical properties of the foam.

It is critical to the success of the process of the invention that the contact between the rising foam and the underside of the panel member 26 takes place only within the area between the locations X and Y. It will be appreciated that there is a fair range of latitude within which the angle of inclination of the panel member 26 can be adjusted and still meet the above requirements. Illustratively, an alternate disposition of the panel member 26 and the suspension means 30, 40 is shown in dotted lines in FIG. 2. Other such alternative dispositions can be readily achieved by appropriate lateral adjustment of the location at which the suspension member 30 is attached to the overhead beam or gantry 28.

The force exerted by the panel member 26 on the foam on which it freely floats serves to cause said foam to flow laterally to the edges of the mold and to render the surface of the foam substantially planar. Thus, FIG. 3 shows a cross-section of a typical polymer foam bunstock which has been produced without the aid of applicants' invention and without the aid of any other method of seeking to achieve rectangular cross-section. It will be seen that the foam in question has a high crown 44 which would have to be removed by cutting along the plane shown by the dotted line in order to produce a bun adapted for cutting into boardstock and the like. This obviously involves the discarding of a substantial amount of potentially valuable polymer foam represented by the crown of the bun.

FIG. 4 shows a typical cross-section of a bunstock produced in accordance with applicants' invention and clearly illustrates the effect of the pressure exerted on the rising foam in the critical region discussed above. The crown 42 shown in the typical foam in FIG. 3 has disappeared and the top 46 of the foam is substantially flat and requires no significant trimming before being cut into bunstock.

The force which the panel member 26 exerts on the rising foam in the critical region between locations X and Y is dependent on the weight of said panel member and also on the distance between the pivot member 34 and the point of tangential contact between the underside of the panel member 26 and the foam. The weight of the panel member 26 can obviously be controlled by appropriate choice of the material from which the panel member is fabricated and by the total size of said panel member. For a standard foam bunstock conveyor system having a width of approximately 4 feet it is found that a sheet of ¾ inch plywood having dimensions 4 × 10 feet with two lengthwise reinforcing struts of 2 × 4 inch studs forms a highly satisfactory panel member when provided with pivot members 34 located about one foot from the downstream end of said member and allowed to depend at an angle to the floor of the conveyor of up to about 30°. The angle employed for any particular foam will vary according to location of the points X and Y in the rise profile of said foam. For example, in the case of a polyurethane foam the point Y is located very close to the top of the rise and the angle of the panel member to the horizontal can be close to 0°. In the case of an isocyanurate foam the point Y occurs earlier in the profile and the angle made by the panel member to the horizontal is greater.

It is to be understood, however, that the panel member 26 can be constructed of other types of material such as reinforced plastic, fiberboard, and the like and the exact choice thereof is not critical to success of operation of the process of the invention provided the weight of said panel member 26 does not exceed the appropriate limit. The underside of the panel member 26, i.e., the surface in contact with the foam, can be planar or convex downwardly across its width. Further, said surface can be coated with appropriate materials such as formica and the like to reduce friction between said underside and the top paper on the foam.

The precise weight and dimensions of the panel member 26 to be employed for any particular polymer foam forming system can be determined readily by a process of trial and error. Fine tuning of the weight of the panel member 26 can be achieved during actual operation of the bunstock line by addition of appropriate weights 47 to the lower end of the panel member 26 when it is desired to increase the force exerted by the panel member 26 on the foam. The weights 47 can take any convenient form such as bricks, metal blocks, sandbags and the like.

The fine tuning of the appropriate weight and disposition of the panel member 26 during operation of the bunstock machine is facilitated by visual observation of the cross-sectional configuration of the finished foam bunstock which is coming down the final section of the conveyor. If said bunstock shows a substantial crown, it is obvious that the force exerted by the panel member needs to be increased. In contrast, if the cross-sectional configuration of the finished bunstock begins to have the appearance shown in FIG. 5, i.e., has upward protrusions 48, it is apparent that the force exerted by the panel member is becoming excessive and should be reduced.

In the embodiments shown in FIGS. 1 and 2 the suspension member 30 and the rope or chain 40 are shown as disposed substantially vertically with respect to the conveyor. This will, in fact, be the case if the suspension member 30 is rigidly fastened to the bracket member 29 and is not free to move. However, where the suspension member 30 is hingeably attached to the bracket 29, and is therefore free to pivot about said bracket, it is found that the pressure exerted by the foam on the underside of the panel member 26 will cause the latter to be displaced in the direction of travel of the conveyor so that suspension member 30 and rope or chain 40 will be disposed at an acute angle to the vertical. This embodiment is illustrated in FIG. 8 which shows what happens when the suspension member 30 is hingeably mounted to the bracket 29 as opposed to being rigidly attached thereto as illustrated in corresponding FIG. 2. When this particular embodiment is being employed, the process of the invention is carried out in the same manner as described previously, it being necessary only to make allowance for the displacement of panel member 26 in the manner shown when positioning the latter in the initial stages of the process.

After the foam bunstock has passed under the panel member 26 and has reached the top of its rise profile, it passes down the conveyor but is still under the constraining influence of the side panels 22. During this period of its development, said foam is still expanding but at a greatly reduced rate compared to that at which it expands during the actual rise period. FIG. 7 shows the cross-sectional configuration of a typical foam bunstock at two stages in its development. The configuration shown in solid lines 50 is that attained by the foam after the completion of the initial rise period. The configuration shown in dotted lines 52 is that attained after all expansion of the foam is complete. In the case of a foam bun having a width of about 48 inches, the difference between the initial configuration 50 and the final configuration 52 is generally of the order of several inches.

In order to permit this additional but minor expansion of the foam to take place without deleterious effect on the resultant foam properties, it has been found advantageous to change the configuration of the latter part of the U-shaped mold formed by the conveyor belt 12 and synchronized side belts 22 to permit such expansion to occur without undue constraint. This particular aspect of the process and apparatus of the invention is illustrated in FIG. 6 which shows a plan view of the pertinent portion of the bunstock conveyor shown in side elevation in FIG. 1. In FIG. 6 the conveyor is shown moving from left to right as indicated by the arrow. After the foam bunstock has passed beneath the panel member 26 it enters the section of the conveyor bounded by the line P—P at one end and the line Q—Q at the other. Within the region in question the side belts 22 and supporting rollers 24 are displaced sideways in a gradually increasing manner so that the increasing width of the conveyor between the inner sides of the side belts 22 will conform to the gradual sideways expansion of the foam bunstock in this region. The exact configuration required in this region, including the distance between the locations P—P and Q—Q, to accommodate any particular foam system can be readily determined by a process of trial and error. Thus, the adjustment of the side belts 22 and rollers 24 can be carried out during actual operation of the foam bunstock conveyor to meet the needs of the particular foam being processed. A constant check can be made, during operation of the conveyor, for the existence of constraining forces exerted by the side belts 22 on the abutting side of the foam bunstock. A simple test which can be used for this purpose consists of sliding, or attempting to slide, a thin strip of material downwardly between the edge of the foam and the side belt. If, at any point along the conveyor, there is excessive resistance to such insertion of the thin strip, the appropriate adjustment of the position of the pertinent section of side belt 22 is effected until the resistance to insertion is removed. Similarly, any overadjustment of the position of the side belts 22 in a given location can be detected and corrected.

After the foam bunstock has passed through the region shown in FIG. 6, it is then caused to proceed down the conveyor to a cutting and unloading station (not shown) where the bunstock is cut into appropriate lengths and removed from the conveyor in accordance with procedures well-known in the art.

The process and apparatus of the invention have been described with particular reference to certain embodiments thereof which have been shown for purposes of illustration only. As will be obvious to one skilled in the art, modifications and variations in the above embodiments can be made without departing from the scope of the invention which is limited only by the claims set forth below.

The process of the invention has a number of advantages over processes previously known in the art. Not only is it extremely simple to operate, requiring no sophisticated apparatus or attachments to conventional foam machinery, but it is readily adaptable to use with a wide variety of polymer foam forming systems exhibiting different foam rise characteristics and rise profile. Thus, in the case of any particular foam system, it is merely necessary to identify the appropriate area of contact for the panel member in the rise profile and to adjust the position of the panel member to accommodate the situation. Further, in the operation of the process of the invention with any particular system, there is generally no reason to adjust the position of the panel member during the operation. The panel member, being free to float on the surface of the foam will accommodate itself readily, without the need for manual operation, to minor variations in height of foam rise caused by minor variations in speed of the conveyor system.

The appearance of the foam cross-section as the bunstock passes down the conveyor provides a ready check on the correct pressure being applied to the rising foam and permits correction, by modifying the weight applied to the panel member, in a rapid and facile manner.

The cell structure and dimensional strengths of the foam bunstock produced in accordance with the process of the invention are generally excellent and superior to those which can be achieved by methods hitherto employed. Thus the dimensional strength of the foam measured in a direction horizontal to the conveyor but at right angles to the direction of travel is generally equal to that in the direction horizontal to the conveyor and in the direction of travel whereas, in foam produced by previous methods, the strength in the latter dimension was usually inferior because of excessive pressure exerted on the foam during its rise. The dimensional strength in the direction of foam rise is greatest and is excellent in the foams produced in accordance with the invention.

Other advantages of the process of the invention will be apparent to one skilled in the art.

We claim:

1. A process for producing a continuous length of polymer foam bunstock having substantially rectangular cross-section, uniform density and uniform cell structure which comprises the steps of:
    advancing at a predetermined, constant rate a continuous conveyor surface along a predetermined path of travel, said conveyor surface comprising a lower supporting portion and separate upstanding portions on laterally opposite sides of said lower portion and defining together a generally trough-like moving mold for the developing foam product;
    continuously depositing liquid polymerfoam forming mixture on the floor of said moving mold at a location near the entrance thereto;
    allowing said foam-forming mixture to expand freely at least until the gel point is reached;
    causing said expanding foam, at a point approaching the top of the foam rise and beyond that at which the gel point is reached but before said foam is no longer sufficiently mobile to be molded without distortion of cell structure, to contact the underside of a panel member having a width substantially co-extensive with that of said moving mold and being pivotally mounted, at the downstream end thereof, above said moving mold, said panel member depending from said pivotal mounting and floating freely on said rising foam in tangential contact therewith; and
    adjusting the downward pressure exerted by said panel member so that it causes said rising foam to assume a substantially rectangular cross-section
    said downward pressure being the sole restraining force applied to the surface of said foam during its entire passage through said trough-like moving mold.

2. The process of claim 1 which comprises the additional step of causing the upstanding side portions of said moving mold to be displaced outwardly in conformity with the further sideways expansion of said foam in the section of said moving mold beyond said floating panel member.

3. The process of claim 1 wherein the downward pressure exerted by said panel member is adjusted by placing appropriate weights toward the downwardly disposed end of said panel member.

4. The process of claim 1 wherein said polymer foam forming mixture is formulated to produce a rigid polymer foam in which the major recurring unit is isocyanurate.

5. The process of claim 1 wherein said polymer foam forming mixture is formulated to produce a rigid polymer foam in which the major recurring unit is urethane.

6. An apparatus for the production of a continuous length of polymer foam bunstock having substantially rectangular cross-section which comprises in combination:

conveyor means comprising a continuously advancing lower supporting portion and separate, vertically disposed, continuously advancing side portions associated with said lower portion so as to define an open-topped mold of generally U-shaped cross-section;

means driving said lower and side portions synchronously along a predetermined path of travel.

means located above the entrance to said conveyor for dispensing foam forming mix on the said lower portion of said conveyor;

a panel member of a width substantially co-extensive with that of said open-topped mold having its end remote from the said foam dispensing means adjustably and pivotally mounted above said open top conveyor, said panel member depending downwardly from said pivotal mounting and adapted to make tangential contact on its underside with the surface of foam rising in said open-topped mold at a point approaching the top of the rise and beyond that at which the gel point is reached but before said foam is no longer sufficiently mobile to be molded without distortion of cell structure; and means located at the end of said conveyor for cutting foam bunstock into lengths of predetermined size and for removing said lengths from said conveyor.

7. An apparatus according to claim 6 which also comprises means for adjusting the distance between said side portions of said open-topped mold to accommodate sideways expansion of foam bunstock passing through said mold.

8. An apparatus according to claim 6 wherein said panel member is provided with means for adjusting the downward pressure exerted by said panel member on the foam rising in said open-topped mold.

9. An apparatus according to claim 6 wherein the underside of said panel member is planar.

10. An apparatus according to claim 6 wherein the underside of said panel member has a surface which is downwardly convex across its width.

* * * * *